United States Patent [19]

Toops

[11] Patent Number: 4,645,996

[45] Date of Patent: Feb. 24, 1987

[54] RECHARGEABLE BATTERY AND ELECTRICAL CIRCUIT FOR CHARGING THEREOF

[75] Inventor: Kenneth E. Toops, Gainesville, Fla.

[73] Assignee: General Electric Company, Schenectady, N.Y.

[21] Appl. No.: 791,497

[22] Filed: Oct. 25, 1985

[51] Int. Cl.$^4$ .................. H02J 7/00; H01M 14/00
[52] U.S. Cl. ............................. 320/2; 429/7; 320/3; 320/4
[58] Field of Search ............. 320/2, 3, 4, 5; 429/7

[56] References Cited

U.S. PATENT DOCUMENTS

| | | | |
|---|---|---|---|
| 3,070,748 | 12/1962 | Worobey et al. | 455/343 |
| 3,089,072 | 5/1963 | Jephcott | 320/2 |
| 4,147,163 | 4/1979 | Newman et al. | 128/9 |
| 4,147,838 | 4/1979 | Leffingwell | 429/1 |
| 4,382,219 | 5/1983 | Heine et al. | 320/2 |
| 4,489,268 | 12/1984 | Beachy | 320/2 |

OTHER PUBLICATIONS

G. E. Publication entitled "Charging Circuit Design for the Power Stick Rechargeable Battery".

Primary Examiner—R. J. Hickey
Assistant Examiner—Mark D. Simpson
Attorney, Agent, or Firm—Philip L. Schlamp; Fred Jacob

[57] ABSTRACT

An electrical circuit is provided which is operable in a first mode to deliver electrical energy to the load of an energy-using device and to a rechargeable battery for charging thereof. The circuit is operable in a second mode to deliver energy to the load of the energy-using device alternatively from either the rechargeable battery or a non-rechargeable battery. The circuit includes a pair of discharge terminals spaced apart by a first preselected distance so as to engage the power terminals of either the rechargeable or non-rechargeable battery. The circuit includes a charging terminal spaced apart from one of the discharge terminals by a distance greater than said first distance so as to engage a terminal extension carried by one of the power terminal contacts of the rechargeable battery whereby only the rechargeable battery may be charged in the circuit.

3 Claims, 5 Drawing Figures

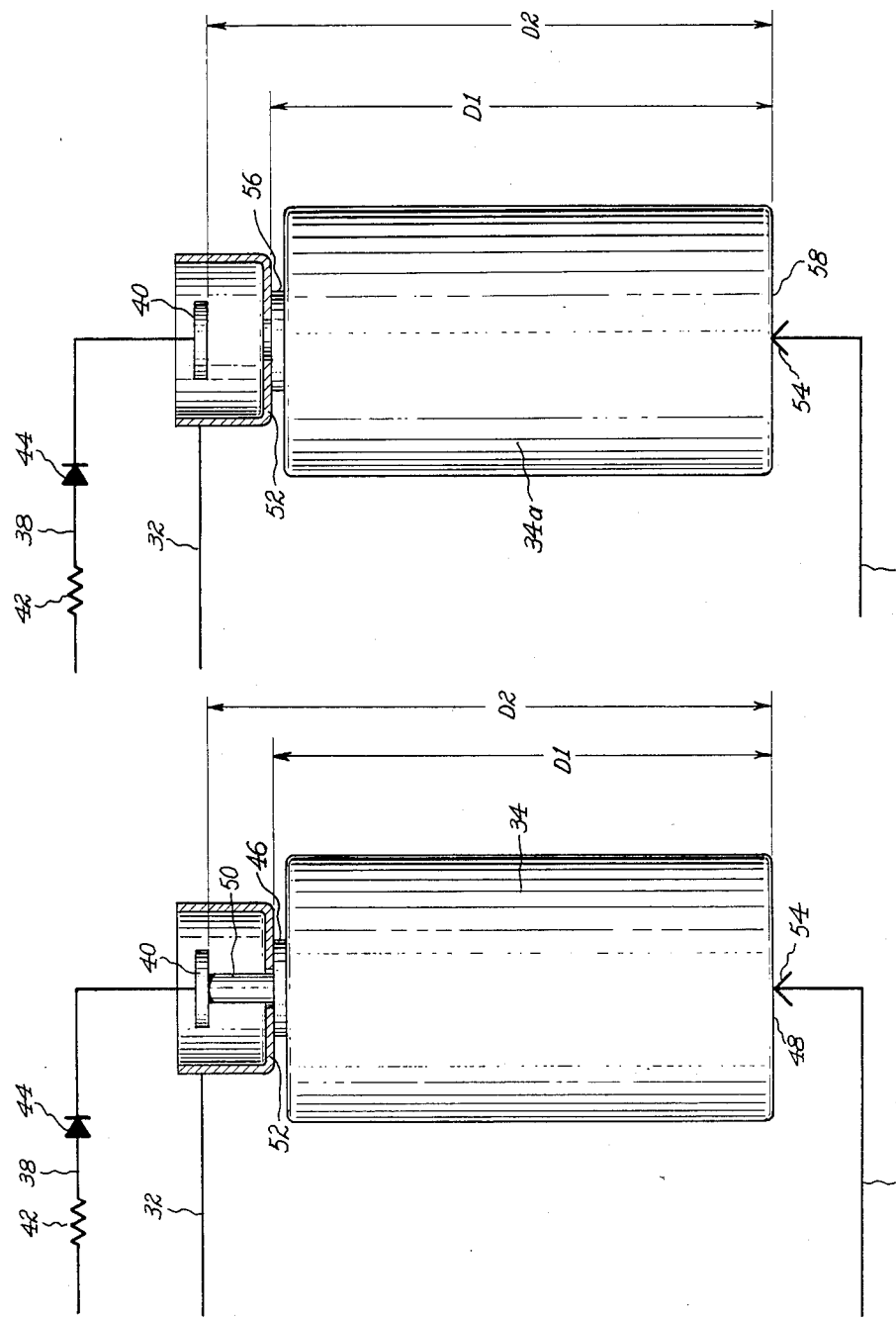

RECHARGEABLE BATTERY AND ELECTRICAL CIRCUIT FOR CHARGING THEREOF

BACKGROUND OF THE INVENTION

This invention relates to rechargeable batteries used in energy-using devices. More particularly, this invention relates to rechargeable batteries and an electrical circuit used in energy-using devices which may be covered either by an external source of power or by power from batteries of either the rechargeable or non-rechargeable type and which have built-in charging means for recharging the rechargeable batteries.

Many battery operated consumer products on the market drain energy from the batteries at high rates. Because of these high drain rates, these energy-using devices are particularly suitable for use with rechargeable batteries and, for user convenience, many of these devices have an electrical circuit which, in addition to permitting the device to be operated from both an external source of energy or from the energy supplied by the battery, permits the battery to be charged while it resides in the energy-using device. That is to say the energy-using device has built-in electrical circuitry for charging the rechargeable battery when the energy-using device is connected to a source of external electrical power.

Rechargeable batteries, such as nickel cadmium rechargeable batteries, are sold in the same AA, AAA, C or D sizes as are primary (non-rechargeable) batteries and, accordingly, either rechargeable or non-rechargeable batteries may be inserted into the energy-using device. Thus, a consumer has the choice of operating the energy-using device with either rechargeable or non-rechargeable batteries. It is known to be advantageous, when employing the circuit described above, to include means in the electrical circuit which will preclude a non-rechargeable battery from being charged if the non-rechargeable battery is installed in the energy-using device. Otherwise, the delivery of charging current to the non-rechargeable battery might possibly result in leakage of electrolyte from the non-rechargeable battery and damage to the energy-using device.

U.S. Pat. No. 4,489,268 teaches a rechargeable battery and electrical circuit for charging a rechargeable battery while it is installed in an energy-using device. This patent further teaches a rechargeable battery with a circumferentially extending charging terminal contact, disposed on the cylindrical surface of the battery between the power terminal contacts of the rechargeable battery. The charging terminal contact on the battery engages a charging terminal contact in the electrical circuit of the energy-using device to effect charging of the rechargeable battery. Non-rechargeable batteries not having the charging terminal contact on its cylindrical surface will not engage the charger's charging terminal contact and hence the non-rechargeable battery will not receive charging current from the charging circuit.

The application of the teachings of U.S. Pat. No. 4,489,268 to smaller standard-size rechargeable batteries, such as AA and AAA standard size batteries is not entirely suitable. More specifically, the permissible diameters of these smaller standard-size batteries are defined by industry standards which set, among other parameters, the maximum diameters of the batteries. For nickel cadmium rechargeable batteries in AA and AAA standard sizes the maximum diameter of the battery corresponds to the diameter of the cell container in which the cell electrodes and electrolyte reside. The limitation in maximum diameter imposed by industry standards is necessary in order to permit the consumer to insert the battery in any of the wide variety of energy-using devices in the marketplace designed to operate on that specific standard size battery. Since many of the AA and AAA rechargeable nickel cadmium batteries on the market today have cell container diameters at or near the maximum diameter permitted, application of the teachings of U.S. Pat. No. 4,489,268 would result in a rechargeable battery with a diameter at the charging terminal contact larger than that defined by industry standards. On the other hand, if the diameter of the charging contact on the battery is set at the maximum diameter permitted by industry standards, then the diameter of the cell container will be less than that defined by industry standards. The former is unacceptable since the battery would not fit in at least some consumer products. The latter is disadvantageous because the reduced diameter of the cell container will very likely result in the cell container having a lesser amount of electrochemically active material therewithin. The reduction in the amount of electrochemically active material results in the cell having a shorter run time (or smaller deliverable energy capacity) than a cell having a container diameter at the maximum diameter defined by industry standards. Accordingly, application of the teachings of U.S. Pat. No. 4,489,268 may result in an AA or AAA battery which is either not within industry standards or which delivers a lesser amount of energy.

SUMMARY OF THE INVENTION

Accordingly, it is an object of the present invention to provide an electrical circuit that, in a first mode, delivers energy from an external source to the load of an energy-using device and to a rechargeable battery and, in a second mode, delivers energy to the load of an energy-using device from either a rechargeable or non-rechargeable battery of the same general size and configuration.

It is another object of the present invention to provide an electrical circuit which permits recharging of only a rechargeable battery which precludes charging of a non-rechargeable battery.

It is yet another object of the present invention to provide an electrical circuit which permits recharging of only a rechargeable battery which has a cell container of a diameter at the maximum dimensional limits of industry standards and which delivers a maximum amount of energy to the load of an energy-using device.

Briefly stated, these and other objects, which will become apparent from the following specification and appended drawings, are accomplished by the present invention which, in one form, comprises an electrical circuit for delivering, in a first mode, energy from an external source of electrical energy to the load of an energy-using device and to a cylindrical axially extending rechargeable battery installed in the electrical circuit to effect charging of the rechargeable battery The electrical circuit is operable, in a second mode, to deliver electrical energy to the load of an energy-using device alternatively from either a rechargeable or non-rechargeable battery having the same diameters. A pair of discharge terminals are disposed in the electrical circuit and connected to the energy-using device. The discharge terminals are spaced apart by a first preselected distance such that each terminal in the pair respectively engages one power terminal of a pair of power terminals of a standard-size non-rechargeable battery inserted in the circuit. A charging contact is electrically connected in the circuit and spaced apart from one of the discharge terminals by a second preselected distance greater than the first selected distance. This precludes the power terminal contacts of the non-rechargeable battery from simultaneously engaging one of the discharge terminals and the charging terminal contact. Charging of the non-rechargeable battery is thereby precluded. The invention further comprises a cylindrical axially extending rechargeable battery having first and second power terminal contacts disposed, respectively, at first and second axially-spaced apart opposite ends of the cylinder for delivering energy to the energy-using device. A terminal extension carried by the first power terminal contact of the rechargeable battery, extends axially away from each of the discharge terminals of the circuit and toward and into engagement with the charging contact at a location the distance of which from the second power terminal contact of the rechargeable battery is greater than the distance between the power terminal contacts of the non-rechargeable battery.

BRIEF DESCRIPTION OF THE DRAWINGS

FIG. 2a is an enlarged schematic view of a portion of circuit 10 with a rechargeable battery residing therein.

FIG. 2b is an enlarged schematic view of a portion of circuit 10 with a non-rechargeable battery inserted therein.

DETAILED DESCRIPTION OF THE PREFERRED EMBODIMENT

Figure 1:
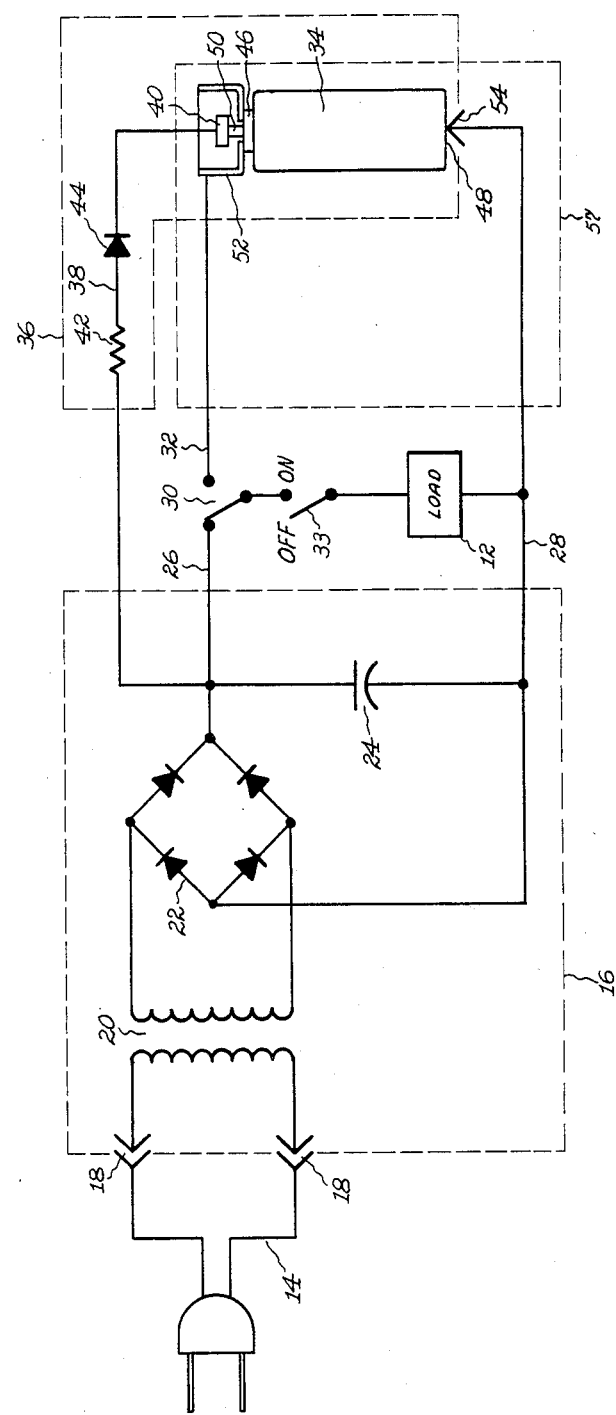
FIG. 1 is a schematic diagram of the circuit comprising the present invention.

Referring now to FIG. 1, there is depicted, generally at 10, an electrical circuit residing in an energy-using device and for providing electrical current to a load 12 within the energy-using device. Circuit 10, in a manner more fully hereinafter to be explained, is adapted, in a first mode, to provide electrical energy from an external source 14 of electrical energy to the load 12 via first power circuit means in the form of an electrical circuit circumscribed by dashed outline 16. Power circuit 16 is comprised of a pair of electrical contacts 18 adapted to be connected to an external electrical energy source 14. Power circuit 16 is also comprised of transformer 20, rectifier 22 and filter 24 arranged in a conventional manner to supply a substantially constant voltage across current conductor lines 26 and 28 and hence across load 12. In a first mode, that is when contacts 18 are in electrical contact with source of external energy 14, power circuit 16 delivers current to load 12 connected across current conductor lines 26 and 28. Electrical circuit 10 includes switch means 30 which connects load 12 across lines 26 and 28 when electrical contacts 18 are connected to the external source of energy 14. When source 14 is unplugged from contact 18, circuit 10 is in a second (or battery powered) mode. In this second mode, switch 30 (actuated by means not shown) is disconnected from line 26 and connected to conductor line 32. Thus load 12 is disconnected from power source 14 and may be battery powered in a manner hereinafter more fully described. Also depicted in FIG. 1, is a second switch 33, which may be manually operated, to turn the energy-using device, for example a radio, on or off.

With circuit 16 connected to external source of electrical energy 14, the circuit 10 is adapted, in its first mode, to also supply electrical energy to a rechargeable battery 34 via second charging circuit means defined by dashed outline 36. Charging circuit 36 is electrically connected to circuit 16 and is comprised of current conductor line 38 connected between conductor line 26 and a charging contact 40. Current conductor line 38 has inserted therein current limiting resistor 42, for limiting the magnitude of charge current through rechargeable battery 32, and unidirectional current flow means, in the form of diode 44, for permitting the flow of charging current only in one direction through current conductor line 38.

Rechargeable battery 34 is of a general conventional cylindrical shape and includes first and second axially spaced apart power terminal contacts 46 and 48 respectively. First power terminal contact 46, disposed at one end of cylindrical battery 34, carries an extended portion in the form of terminal extension 50 extending toward charging contact 40 for engagement therewith. Second power terminal contact 48 is disposed at the other end of cylindrical battery 34 opposite power terminal contact 46.

When rechargeable battery 34 is inserted in electrical circuit 10, first and second power terminal contacts 46 and 48 are adapted to respectively engage a pair of discharge terminals 52 and 54. When external power source 14 is disconnected from electrical contacts 18, switch 30 connects load 12 between current conducting lines 28 and 32 and hence in series with rechargeable battery 34. Electrical circuit 10 is then in the aforementioned second mode of operation. In this mode, third discharge circuit means, defined by dashed outline 57, permit energy discharged from battery 34 to be received by energy using device 12. More specifically, current discharged from rechargeable battery 34 flows through the circuit 57 defined by battery 34, discharge terminal 52, conductor line 32, load 12, conductor line 28 and discharge terminal 54.

When circuit 10 is in its first mode of operation, recharging of rechargeable battery 34 is accomplished by the flow of charging current through charging circuit 36 defined by conductor line 38 (including resistor 42 and diode 44), charging terminal 40, battery 34, discharge terminal 54 and conductor line 28. Since, in the first mode of operation, load 12 is in parallel with battery 34, powering of load 12 and recharging of battery 34 may be accomplished simultaneously or battery 34 may be recharged when load 12 is removed from the circuit by switch 33.

Referring now to FIG. 2a and FIG. 2b, FIG. 2a depicts an enlarged schematic view of a portion of circuit with rechargeable battery 34 inserted between discharge terminals 52 and 54. FIG. 2b depicts an enlarged schematic view of a portion of circuit 10 with a conventional non-rechargeable battery 34a of standard dimensions inserted between discharge terminals 52 and 54. In FIG. 2b, cylindrical axially extending non-rechargeable battery 34a includes a pair of spaced-apart power terminal contacts 56 and 58 each of which is respectively disposed at opposite ends of the cylinder comprising non-rechargeable battery 34a. Discharge terminals 52 and 54, connected in electrical circuit 57 as heretofore described, are axially spaced apart from each other by a first distance preselected to correspond to the axial spacing between power terminal contacts 56 and 58 of non-rechargeable battery 34a. More specifically, discharge terminal contacts 52 and 54 are spaced apart by a first preselected distance D1 which is equal to the distance between power terminal contacts 56 and 58 of non-rechargeable battery 34a. Thus, discharge terminal contacts 52 and 54 may simultaneously engage power terminal contacts 56 and 58, respectively, when the non-rechargeable battery 34a is inserted into circuit 10 between discharge terminal contacts 52 and 54. With this engagement, discharge terminals 52 and 54 are adapted, when circuit 10 is in the aforedescribed second mode, to transmit electrical energy discharged from non-rechargeable battery 34a to load 12 via discharge circuit 57. While non-rechargeable battery 34a thus supplies electrical energy to load 12 in the second mode, battery 34a, being shorter than the distance between charging contact 40 and discharge terminal 54, does not simultaneously engage charging contact 40 and discharge terminal 54. Accordingly, non-rechargeable battery does not receive charge current when circuit 10 is in the aforementioned first mode. In this regard, charging contact 40 is axially spaced apart from one discharge terminal contact 54 by a second preselected distance D2 which is greater than the preselected distance D1 between power terminal contacts 56 and 58 of non-rechargeable battery 34a.

With reference to FIG. 2a, it is observed that, when rechargeable battery 34 is installed in circuit 10, power terminal contacts 46 and 48 respectively engage discharge terminal contacts 52 and 54. With this engagement, discharge terminals 52 and 54 are adapted, when circuit 10 is in the aforementioned second mode, to transmit electrical energy from rechargeable battery 34 to load 12 via discharge circuit 57.

For purposes of charging rechargeable battery 34, terminal extension 50, carried by and in electrical contact with power terminal 46 of rechargeable battery 34, extends axially away from discharge terminal 54 and into engagement with charging contact 40. Engagement between extension 50 and charging contact 40 is achieved at a location spaced from power terminal contact 48 by the distance D2 which is greater than the first preselected distance D1 between discharge terminals 52 and 54. When circuit 10 is in the aforementioned first mode of operation, that is connected to a source of external power, charge current may flow through a path defined by current conductor line 38, charging contact 40, terminal extension 50, power terminal contact 46, rechargeable battery 34, power terminal contact 48 and conductor line 28.

Terminal extension 50, carried by power terminal contact 46 of rechargeable battery 34, may be integrally formed as a part of power terminal 46. For example, terminal extension 50 may comprise a portion of power terminal contact 46 which is stamped to provide a protrusion which extends away from the planar portion of power terminal contact 46 and toward and into engagement charging contact 40. Alternatively, terminal extension 50 may comprise a rigid separate element which is welded to power terminal contact 46 thereby providing electrically conductive engagement with contact 46.

Nickel cadmium rechargeable batteries known in the art typically provide a positive power terminal contact which is part of the cell cover. The cover cooperates with the cell container to enclose the internal components of the cell. More specifically, the cell cover is connected to the positive electrode disposed within the cell and the cover then is secured to the container such as by crimping the cell container around and over the periphery of the cover. Of course, the cover is electrically isolated from the cell container by a plastic insulator whereby the cover functions as the positive power terminal contact of the cell or battery and the other end of the container functions as the negative power terminal contact.

Figure 3:
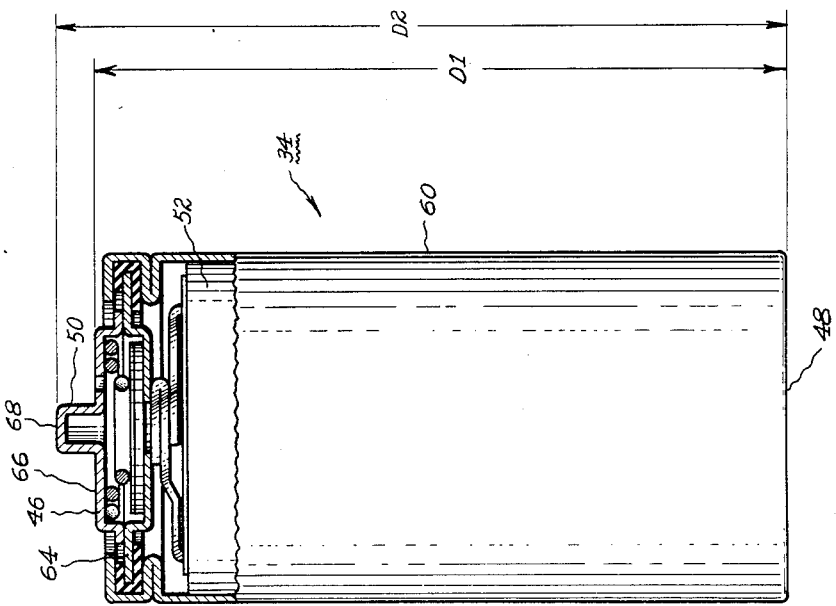
FIG. 3 is an enlarged view of a battery comprising the present invention.

Referring now to FIG. 3, there is schematically depicted a portion of an enlarged nickel cadmium rechargeable battery 34 shown partially in cross section. Battery 34 is comprised of a cylindrical cell container 60 in which resides an electrode roll 52 having a positive electrode, a negative electrode, a separator between the electrodes and an electrolytic fluid in contact with each electrode. The interior of cell container 60 is sealed from the external environment by cell cover 64 residing at one end of cell container 60. As is known in the art, cell cover 64 is electrically connected to the positive electrode within the container 60 whereby cover 64 comprises the positive power terminal contact 46 of the battery 34. The axially facing negative power terminal contact 48 of the cell is comprised, at the other end of the cell, of the axially facing end of container 60 itself which is connected electrically to the negative electrode within the container 60.

Cover 64 includes an annular and axially outwardly facing positive power contact surface 66 spaced apart from negative power terminal contact 48 by a distance D1 which is equal to the standard distance between a pair of power contacts of a standard AA, AAA, C or D size non-rechargeable battery. These standard distances correspond to the length of the standard non-rechargeable batteries and are set by the American National Standards Institute. For a AA size cell is set at between 1.988 and 1.906 inches, for a AAA size cell is set at between 1.752 and 1.673 inches, for a C size cell is set at between 1.969 and 1.875 inches and for a D size cell is set at between 2.421 and 2.312 inches.

Cover 64 further includes a terminal extension 50 carried by the cover and extending axially away from the cell container 60. Terminal extension 50 terminates in a terminal extension charging contact surface 68 adapted to engage charging contact terminal 40 in the energy-using device. Surface 68 is spaced apart from negative power terminal contact by the distance D2 greater than the standard distance D1 separating the power terminal contacts of a standard non-rechargeable cell. In this manner then, the present invention provides a rechargeable battery 34 for use in an energy-using device having means for charging the rechargeable battery 34. The rechargeable battery 34 has power terminal contacts 46 and 48 spaced apart at the same distance as the power terminal contacts of a standard non-rechargeable cell whereby both the rechargeable and non-rechargeable batteries may be used to supply energy to the energy-using device. However, since only the rechargeable battery 34 may contact, with its terminal extension 50, charging terminal 40, only the rechargeable battery will be recharged.

Figure 4:
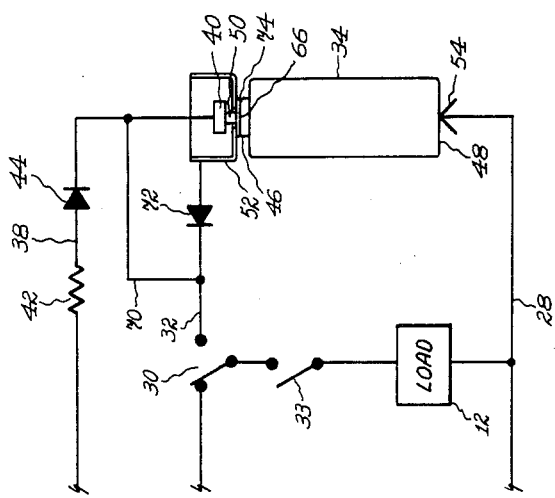
FIG. 4 is an alternative embodiment of the circuit comprising the present invention.

Referring now to FIG. 4, there is depicted an alternative embodiment of the present invention. More specifically, FIG. 4 depicts a portion of the circuit depicted in FIG. 1 wherein the charging terminal also functions as one of the discharge terminals of circuit 10 when a rechargeable battery is inserted in circuit 10. Those components of the circuit 10 shown in FIG. 4 which are the same as those shown in FIG. 1 are indicated by like numerical designations. The circuit depicted in FIG. 4 includes a current conductor line 70 connected between charging terminal 40 and current conductor line 32. Additionally, diode 72 is disposed in current conductor line 32 at a point between discharge terminal 52 and the junction of lines 70 and 32. Diode 72 prevents the flow of charging current through line 32 when circuit 10 is in the first mode of operation; that is when charging current is being delivered to battery 34 via contact 40. Without diode 72, charge current would be delivered to a non-rechargeable battery via discharge terminal 52.

For use in the embodiment of FIG. 4, rechargeable battery 34 carries an insulative member 74, which may be in the form of a thin annular plastic membrane or sheet, in a manner effective to isolate power terminal contact surface 66 from discharge terminal 52. In the embodiment of FIG. 4, energy is supplied from battery 34 to the load 12 through charger terminal contact 40, current conductor line 70 and current conductor line 32. In this manner, when rechargeable battery 34 is inserted in circuit 10, charge terminal contact 40 not only functions as a charging terminal during the aforementioned first mode of operation but also functions as a discharge terminal during the aforementioned second mode of operation when load 12 is connected across current conductor lines 28 and 32. When non-rechargeable 34a is inserted in circuit 10, discharge terminals 52 and 54 serve to permit non-rechargeable battery 34a to supply energy to load 12 during the second mode of operation of circuit 10 in a manner hereinbefore described.

While the preferred embodiment of the present invention has been depicted and described, it should be appreciated that modifications and alterations may be made in the embodiment without departing from the scope of the invention as set forth in the appended claims.

I claim:

1. A nickel-cadmium rechargeable cell for use in an energy-using device having at least one charging terminal contact for recharging said cell, said energy-using device adapted to alternatively receive either a standard cylindrical AA, AAA, C or D size non-rechargeable cell having a pair of power terminal contacts spaced apart by a standard distance, said rechargeable cell comprising:
   a hollow cylindrical cell container one end of which provides an axially facing negative power terminal contact;
   a cell cover disposed at the other end of said cylindrical cell and electrically insulated from said container and said cover cooperating with said container to seal the interior of said cell from the environment external thereto, said cover having a positive power terminal contact surface spaced apart from said negative power terminal contact by a distance equal to said standard distance, said cover further having a terminal extension carried by said cover and extending axially away from said cell container, said terminal extension having a terminal extension charging contact surface adapted to engage said charging terminal contact of said energy-using device, said surface spaced apart from said negative power terminal contact by a distance greater than said standard distance.

2. An electrical circuit disposed in an energy-using device operable in a first operable mode to deliver electrical energy to the load of said energy-using device and to a rechargeable battery in said electrical circuit, said electrical circuit operable in a second operable mode to deliver electrical energy to said load alternatively from either a cylindrical axially extending non-rechargeable battery or a rechargeable battery of the same diameter as said non-rechargeable battery, said non-rechargeable battery having a pair of axially spaced apart power terminal contacts respectively disposed at opposite ends of said non-rechargeable battery, said circuit comprising:
   a cylindrical axially extending rechargeable battery disposed within said electrical circuit, said rechargeable battery having first and second axially spaced apart power terminal contacts disposed at first and second axially spaced apart opposite ends of said cylindrical for delivering electrical energy to said load of said energy-using device;
   first circuit means for delivering electrical energy from an external source of power to said load of said energy-using device when said electrical circuit is operable in said first mode;
   second circuit means for delivering energy from said external source of power to said rechargeable battery when said electrical circuit is in said first mode to thereby charge said rechargeable battery;
   third circuit means for delivering energy alternatively from said rechargeable or said non-rechargeable battery to said load of said energy-using device when said electrical circuit is operable in said second mode;
   switch means for switching said electrical circuit from said first operable mode to said second operable mode;
   a pair of discharge terminals electrically connected in said electrical circuit and electrically connected to said load of said energy-using device, one discharge terminal in said pair spaced apart from the other discharge terminal in said pair by a first preselected distance selected to correspond to the spacing between said pair of non-rechargeable battery power terminal contacts, said discharge terminals transmitting electrical energy discharged from said non-rechargeable battery to said load of said energy-using device during said second mode when said non-rechargeable battery is inserted in said circuit;
   a charging contact electrically connected in said second circuit means and axially spaced apart from said one of said discharge terminals by a second preselected distance greater than said first preselected distance to preclude said power terminal contacts of said non-rechargeable battery from simultaneously engaging said one of said discharge terminals and said charging contact;
   a terminal extension carried by said first power terminal contact of said rechargeable battery, said extension extending axially away from said one of said discharge terminals toward and into engagement with said charging contact;
   means for electrically isolating said other of said discharge terminals from said first power terminal contact of said rechargeable battery when said rechargeable battery is inserted into said electrical circuit between said pair of discharge terminals.

3. A nickel-cadmium rechargeable battery for use in an energy-using device having at least one charging terminal contact for recharging said battery, said energy-using device adapted to alternatively receive either a standard cylindrical AA, AAA, C or D size non-rechargeable battery having a pair of power terminal contacts spaced apart by a standard distance, said rechargeable battery comprising:
- a hollow cylindrical battery container one end of which provides a first axially facing power terminal contact;
- a battery cover disposed at the other end of said cylindrical container and electrically insulated from said container, said cover cooperating with said container to seal the interior of said battery from the environment external thereto, said cover having a second power terminal contact surface spaced apart from said first power terminal contact by a distance equal to said standard distance, said cover further having a terminal extension carried by said cover and extending axially away from said battery container, said terminal extension having a terminal extension charging contact surface adapted to engage said charging terminal contact of said energy-using device, said surface spaced apart from said first power terminal contact by a distance greater than said standard distance.

* * * * *